Patented Apr. 10, 1945

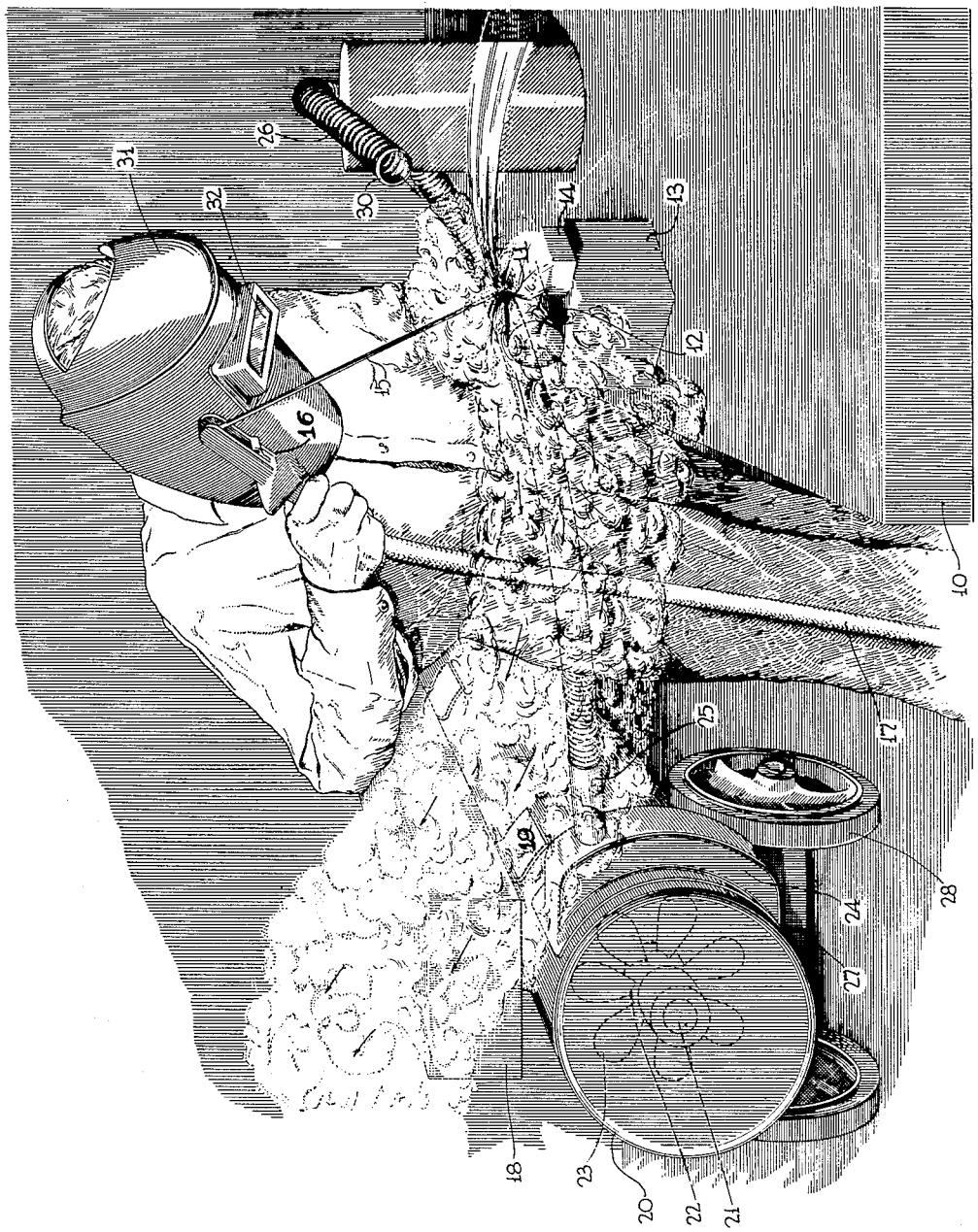

2,373,598

UNITED STATES PATENT OFFICE 2,373,598

ARC WELDING APPARATUS

Alfred Reeb, Philadelphia, Pa., assignor to Edward G. Budd Manufacturing Company, Philadelphia, Pa., a corporation of Pennsylvania Application May 27, 1943, Serial No. 488,725

1 Claim. (Cl. 219—8)

This invention relates to arc welding apparatus.

In arc welding apparatus, welding is accomplished by the formation of an electric arc between a readily fusible supply metal as an electrode and metal adjacent the weld point in the workpiece so that the heat of the arc brings about fusion of the fusible material and incorporation of the same with the workpiece at the point of weld to seal a joint or effect some similar purpose. In carrying out arc welding as indicated, the operator is confronted with several difficulties which tend to reduce efficiency of operation and decrease the value and uniformity of the weld. One of these difficulties is the formation of obnoxious gaseous fumes which are breathed by the operator, resulting in injury to health. Another important difficulty relates to the impairment of the window of the operator's helmet due to sputtering of molten metal on the window glass causing rapid diminution of visibility.

The following objects therefore are contemplated in this invention: to provide means for driving gas away from the point of the weld in arc welding apparatus in a manner to prevent inhalation by the operator; to provide apparatus for preventing deposition of molten metal on the helmet window in the operation of arc welding; to provide means for varying the velocity of gases impinging at the point of weld substantially in accordance with variation in voltage of the current supply to the arc of the weld; to provide means for effectively channelling the movement of gas derived from arc welding; to provide means for directing at will the flow of air in any desired direction in relation to an electric arc weld; and to provide a conduit for gas flow having a terminal opening or nozzle inoperative to modify the velocity relationship of the gas moving through the conduit.

Other objects of the invention will appear on consideration of the details of the modification of the invention which may be preferred as hereinafter described and as shown in the accompanying drawing, illustrating the apparatus as applied to electric arc welding.

The drawing indicates an operator of arc welding apparatus positioned at a work bench 10 and engaged in welding together a joint 11 in a tubular workpiece 12 as supported on the bench block 13 and positioned by holding blocks 14. For this welding operation a fusible metal electrode 15 is applied at its tip to the point of weld the same being in series with the hand supported holder and switch unit 16 through which the operator controls the arc and guides the electrode point at the weld. Electric current is supplied to the electrode 15 through the flexible cable 17 the same having connection to a control box 18 supported by means of base plates 19 on the tubular casing 20 of a dynamo-electric machine. This machine may be of any desired type suitable for the special conditions under which operations are conducted. For example, where external power sources are available the machine may be a motor-generator for the development of direct current at the point of arc fusion; or under certain alternative conditions the machine may be a generator appropriately connected to a prime mover; or further, where alternating current is usable at the weld point, the machine may be simply a motor for generation of air pressure in conjunction with a transformer.

The rotor of the dynamo-electric machine is supported within the casing 20 on a central shaft 21 indicated in dotted outline, and to this shaft also is secured a fan wheel 22 having radially projecting blades 23 angularly positioned so as to draw air through the casing 20 and consequently through the dynamo-electric machine and expel the same through an annular vent enclosed by the manifold 24 from which projects an outlet tubing 25 forming a coupler to a conduit or hose 26. The conduit 26 desirably is constructed of flexible material which permits bending of the conduit and when bent the angular flexure is maintained. One form of construction for a flexible conduit of this type includes as a flexible element a series of overlapped turns of a metal spiral, each turn frictionally engaging the other so that when the conduit is bent the shape is retained. It is pointed out that the conduit is circular in cross section and of uniform diameter and that the nozzle 30 also is of the same diameter as the main body of the conduit.

The casing 20 with the superimposed control box 18 and containing the dynamo-electric machine is supported as indicated on a frame 27 movably mounted on wheels 28. As illustrated also the operator is provided with a protective helmet 31 having a sight aperture screened by the glass strip 32.

The operation of the apparatus may now be described. With the dynamo-electric machine developing power at a given voltage value and speed of rotation of the rotor and the nozzle 30 of conduit 26 directed toward the work, the operator applies the arc welding electrode 15 to the workpiece at the weld point and manipulates the switch to turn on the electric power. Immediately current flows across the gap between the tip of the electrode 15 and the workpiece, bringing about the fusion of the electrode tip and the integration of the fused metal with the workpiece joint. This is accompanied by diffusing gas fumes and sputtering fused metal which if uncontrolled proceeds to the helmet of the operator and disadvantageously affects the welding operation. However, due to the fact that air circulation developed by the fan wheel of the dynamo-electric machine has free passage through the conduit 26 to the nozzle 30 thereof, there emerges from the nozzle a flow of air in circular section which proceeds at a velocity variable directly in accordance with the pressure in the casing 20 which in turn is a function of the speed of rotation of the fan wheel 22. This air proceeding from the conduit nozzle 30 tends to expand conically and thus to envelop the weld point with an enclosing sheet of fast moving air, channeling the obnoxious gases developed at the weld point and conveying them transversely from the axis of the arc to a point where they do not disturb the operator. In addition the molten metal spatter formed at the arc is likewise deflected laterally from the axis of the arc thus preventing contact with the viewing glass 32 of the helmet.

In addition the uniform cross section of the conduit 26 combined with the uniform dimension of the nozzle 30 insures an equable and uniform progression of gas flow insufficient in concentration of pressure to disturb the proper application of fused metal at the point of weld, but nevertheless. sufficient to remove surface film metal at the joint, so that not only is visibility obtained by absence of clouding on the helmet glass and limitation of lighting due to the light impervious fumes but also by elimination of the surface weld film so that the operator may examine the weld as the work proceeds without interruption of the weld procedure. This greatly facilitates and expedites the welding operation. It is pointed out also that insamuch as the velocity of gas flow is directly related to the electric power source or speed of rotation of the rotor of the dynamo-electric machine, there is an agreement generally in the variation of the velocity of gas flow with source voltage and arc current depending on said source for variation. It follows that under conditions where an increase in current flow at the point of the weld is due to an increase in voltage with consequent increase in the development of gases and sputtering metal, simultaneously there is developed an increase in the velocity of gas flow giving added capacity for the removal of gas and metal occasioned by the increase in voltage.

The disclosure relates to apparatus and procedure found effective to accomplish the indicated objects, but it is apparent that modification of the invention may readily be made coming within the scope of the claim hereto appended.

What is claimed is:

In electric arc welding, an electric dynamo-electric machine, arc welding means, a conductor for conducting current from said dynamo-electric machine to the welding means, a conduit for conducting air to the welding means from said generator and single means including a fan for cooling said generator and forcing air through said conduit to the welding means, whereby gases formed by the welding means are dissipated.

ALFRED REEB.